(12) United States Patent
Harris et al.

(10) Patent No.: US 7,222,128 B2
(45) Date of Patent: May 22, 2007

(54) METHOD FOR UPDATING AND PRESERVING DATA WHEN PERFORMING A SOFTWARE UPGRADE

(75) Inventors: Mark N. Harris, New Haven, CT (US); Derek DeGennaro, West Haven, CT (US); Wesley A. Kirschner, Hamden, CT (US); George T. Monroe, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 477 days.

(21) Appl. No.: 10/812,375

(22) Filed: Mar. 29, 2004

(65) Prior Publication Data

US 2005/0216432 A1    Sep. 29, 2005

(51) Int. Cl.
*G06F 17/00* (2006.01)
*G06F 7/00* (2006.01)

(52) U.S. Cl. .................... 707/102; 707/101

(58) Field of Classification Search .............. 707/1, 707/3, 102, 10, 101; 715/523, 516
See application file for complete search history.

(56) References Cited

U.S. PATENT DOCUMENTS 6,577,158 B2 * 6/2003 Gupta ................ 326/39
6,626,957 B1 * 9/2003 Lippert et al. ............ 715/513
6,658,625 B1 * 12/2003 Allen .................... 715/523
6,792,431 B2 * 9/2004 Tamboli et al. ............ 707/102
6,988,095 B1 * 1/2006 Dorfman .................. 707/3

\* cited by examiner

*Primary Examiner*—Don Wong
*Assistant Examiner*—Hung Tran Vy
(74) *Attorney, Agent, or Firm*—Brian A. Lemm; Angelo N. Chaclas

(57) ABSTRACT

The present invention relates to a method of converting data stored in one or mores files from a first format to a second format. The files include one or more records, with each record including one or more fields of data. Each of the records is associated with a first data map corresponding to the first format and a second data map corresponding to the second format. The method converts each file, record by record, using the information from the first and second data maps associated with the selected record. A determination is made as to whether each field is present in the second format, and if so, the field data is copied to a new record at a field location for the field that is set forth in the second data map.

7 Claims, 3 Drawing Sheets

NEW DATA MAP - RECORD TYPE I.

| FIELD NAME | FIELD TYPE | FIELD TYPE LENGTH | FIELD LENGTH | FIELD LOCATION | AGGREGATE ITEM MAP |
|---|---|---|---|---|---|
| ACCOUNTID | UNSIGNED SHORT | 2 | 1 | 0 | NULL |
| PARENTID | UNSIGNED SHORT | 2 | 1 | 2 | NULL |
| OWNERID | UNSIGNED SHORT | 2 | 1 | 4 | NULL |
| SPEEDCODE | UNSIGNED LONG | 4 | 1 | 6 | NULL |
| FULLNAMEREC | UNSIGNED LONG | 4 | 1 | 10 | NULL |
| FULLREC | UNSIGNED LONG | 4 | 1 | 14 | NULL |
| NAME | UNSIGNED SHORT | 2 | 79 | 18 | NULL |
| ACCOUNTCODE | UNSIGNED SHORT | 2 | 21 | 176 | NULL |
| ATTRIBUTES | UNSIGNED SHORT | 2 | 1 | 218 | NULL |
| HOSTACCOUNTID | UNSIGNED LONG | 4 | 1 | 220 | NULL |
| LEVEL | UNSIGNED CHAR | 1 | 1 | 224 | NULL |

Fig. 1B

METHOD FOR UPDATING AND PRESERVING DATA WHEN PERFORMING A SOFTWARE UPGRADE

FIELD OF THE INVENTION

The present invention relates to a method for updating data, and more particularly, a method for updating existing data used in software when the software has been updated and/or revised in such a manner that the format of the data it uses has changed.

BACKGROUND

Software applications, such as a software system embedded in a device like a mailing machine, typically create, operate on and store data in a particular pre-determined data format. Such software applications are often updated and/or revised one or more times during the life of the software. Many times, the updates and/or revisions to the software involve a change or changes to the format of the data that may be utilized by the software. In such cases, old, existing data (created and stored before the update or revision) cannot, in its present form, be utilized by the updated and/or revised software because the updated and/or revised software can only utilize data that is in the current (new) data format. The old, existing data, however, is often critical to the user of the software. It is thus frequently necessary that the old, existing data be made useable by the updated and/or revised software.

A number of prior art methods have been developed for making such old, existing data useable by an updated and/or revised software application. In one such method, a separate software utility is written and provided with the updated and/or revised version of the software. The separate software utility is written for a specific existing data format (the format of the data used by the software prior to the update and/or revision) and a specific new data format (the data format of the updated and/or revised software) and is used to convert the old, existing user data from the existing data format to the new data format. Because such prior art software utilities are specific to particular old and new data formats, they must be written for each specific software update and/or revision, and may not be used generically for any update and/or revision that involves a change in data format.

In another prior art method, the old, existing data is extracted and manually converted from a specific existing data format to a specific new data format. For example, the old, existing data may be exported to an Excel spreadsheet or the like, where it is modified to conform to the new data format. Once modified, the data may be imported by the updated and/or revised version of software for use thereby. This method, while allowing the old data to be used, is disadvantageous because it is labor intensive and requires specialized knowledge of the two particular data formats in question.

SUMMARY OF THE INVENTION

The present invention relates to a method of converting data stored in a file from a first (e.g., old) format to a second (e.g., new) format. The file includes one or more records, with each record including one or more fields of one or more data elements. Each of the records is associated with a first data map corresponding to the first format and a second data map corresponding to the second format. The method includes accessing a selected record from the file, initializing a new record, and for each field of the selected record, using the first data map associated with the selected record and the second data map associated with the selected record to determine whether the field is present in the second format, and if the field is present in the second format, copying the one or more data elements of the field to the new record at a field location for the field that is set forth in the second data map that is associated with the selected record. These steps are repeated for each of the remaining records of the file until all of the records in the file have been updated. The data to be converted may further include data stored in one or more additional files having one or more records, each of the records having one or more fields having one or more data elements. Each of these records is associated with a first data map corresponding to the first format and a second data map corresponding to the second format. The method, in this embodiment, further comprises repeating the accessing, initializing, using, and repeating steps recited above for each of the additional files, where in each case the file being operated upon is one of the additional files.

The using step of the present invention may further include issuing a warning of potential data loss if a first size of one or more data elements of the field in question as set forth in the first data map associated with the selected record is larger than a second size of the one or more data elements of the field as set forth in the second data map associated with the selected record. Preferably, the first data map and the second data map associated with the selected record include information relating to a field type length and a field length for each field in the selected record. The first and second size for each of the fields is based on the field type length and field length information for each field. In addition, the initializing step preferably involves initializing the new record in a temporary file, wherein the method further includes saving the temporary file as a new file after each of the records have been updated. Alternatively, the method may further comprise overwriting the file being updated with the temporary file after all of the records have been updated. The new record is preferably initialized with one or more default values, such as zero values, and the new record is preferably in the second format.

Therefore, it should now be apparent that the invention substantially achieves all of the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 1B is a representation of a data map for a record corresponding to the record shown in FIG. 1A in a new data format utilized by an updated and/or revised version of the software application.

DETAILED DESCRIPTION OF THE PREFERRED EMBODIMENTS

The present invention relates to a method of converting data from a first, old format that is no longer useable by an updated and/or revised software application to a second, new format used by the updated and/or revised software application. The method of the present invention has universal applicability, meaning it is not specific to any two particular data formats.

The preferred embodiment of the present invention contemplates a software application wherein data is stored in one or more files, with each file containing one or more records of data. Each record in turn contains one or more (usually multiple) fields of data. In addition, each record has a format that follows one of one or more pre-determined types or formats supported by the software. The type or format of the record specifies the fields the record contains and the size and location of data in the record. Within each file, all of the records contained therein are of the same type or format, meaning they all have the same fields of data with the same size and data location characteristics. Thus, while there may be multiple record types and as a result different files may have records of different types, within each particular file all records are of the same type. Accordingly, each file may be classified and operated upon according to the type of record it contains.

The present invention utilizes what are known as data maps to simplify, automate and make generic or universal the process of converting old, existing data in a first, old format (i.e., the records are in an old format) used and stored by a software application to a second, new format (i.e., the records are in a new format) that may be used by an updated and/or revised version of the software. A data map is a compilation of information that represents and describes the format of a particular type of record, including the number of fields the record type has, the name of each field, and the data type, size, location and other characteristics of each field. Each record type supported and used by the software has its own data map, and as data formats change with updates and/or revisions to the software, the corresponding data maps change. Typically, the data maps are provided as separate files that are stored with the current version of the software application. As the software is updated and/or revised, new data maps are provided with the updated and/or revised version of the software. The data maps can be created, for example, utilizing a special software utility that is used when the software application is designed and developed.

Figure 1A:
FIG. 1A is a representation of a data map for a record in an old, existing data format utilized by a software application prior to an update or revision.

FIG. 1A is a table that represents the data map, indicated by reference numeral 5, for an example record type I used in one or more files of an example software application. The example record type I shown in FIG. 1A is, for illustrative purposes, used by the software prior to an update and/or revision (and thus is an old format). As will be appreciated, the example software application will likely have one or more additional record types, each having its own data map (not shown in the Figures), that may be used to store data in files. FIG. 1B is a table that represents the data map, indicated by reference number 10, for a corresponding example record type I used in one or more files of the example software application after it has been updated and/or revised. Thus, the example record type I shown in FIG. 1B is in a second data format which is a new data format used by the software after being updated and/or revised. As will be appreciated, each record type used by the software will preferably, to the extent a change has occurred, have a new data map that represents the format used by the updated and/or revised software.

As seen in FIGS. 1A and 1B, data maps 5 and 10 each list all of the fields that are included in all records that are of record type I (both old and new format). In addition, for each listed field, other information relating to the field and the data stored therein is provided including: (1) field type, which identifies for the relevant programming language, such as C, the data type (from a set of specified data types) of the data to be stored in that field; (2) field type length, which identifies in bytes the size of each element of data that is stored in that field; (3) field length, which identifies the number of data elements stored in that field; (4) field location, which identifies the location in the record, in terms of ordered numbers of bytes, where the data in that field begins; and (5) aggregate item map, which, if applicable, provides information about a specifically created (non-standard) aggregate data type used for the field (in the data maps 5 and 10, all data types are standard so null values are provided for each aggregate item map location). Thus, data maps 5 and 10 provide detailed information about the data stored in any file that utilizes record type I (in both the old and new formats).

Also, by comparing the old and new data maps, one can determine how the data format has changed. As can be seen in FIGS. 1A and 1B, record type I has changed between the old format represented by data map 5 and the new format represented by data map 10 as follows: (1) the field named "SpeedCode" has changed from an "unsigned short" field type having a field type length of 2 to an "unsigned long" field type having a field type length of 4; (2) a new field named "AccountCode" has been added at field location 176; (3) the field named "Attributes" has been moved to field location 218; (4) the field named "HostAccountID" has been moved to field location 220; and (5) the field named "Level" has been moved to field location 224.

Figure 2:
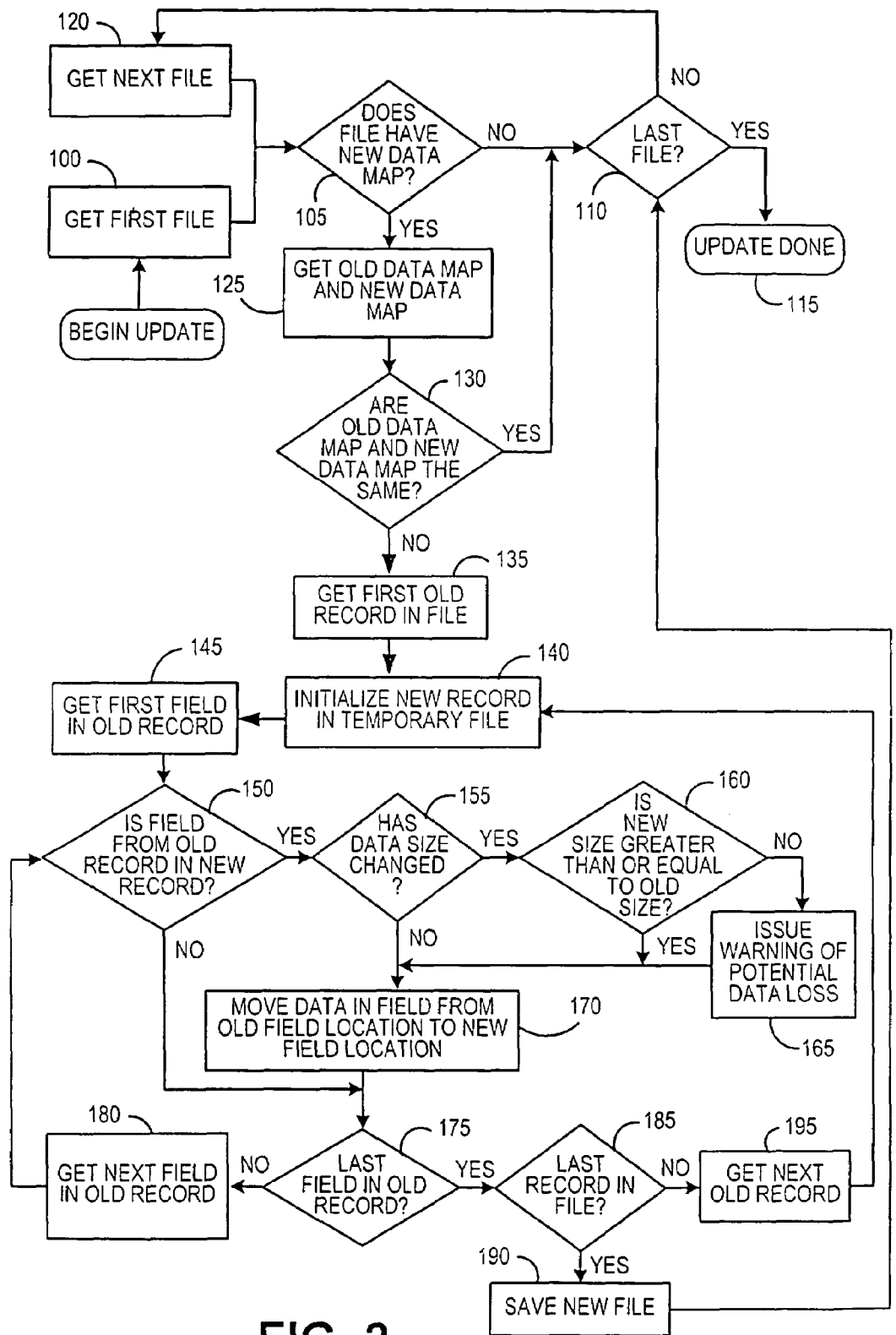
FIG. 2 is a flow diagram illustrating a method of updating and preserving data when performing a software upgrade according to the present invention.

FIG. 2 is a flow diagram that illustrates a method according to the present invention for updating and making useable old, existing files of data when a software application is updated and/or revised in a manner that changes the format of the data it may utilize. The method converts one or more files of the old, existing data that are in a first, old (no longer useable) format to one or more files of data in a second, new format that is useable by the updated and/or revised software. The method operates file by file to perform the conversion, and within each file it operates record by record to convert each record, using data map information for the appropriate record type, from the old format for that record type to the new format for that record type.

Referring to FIG. 2, the method begins at step 100 where the first file of a group of one or more files to be updated is obtained. The files to be updated are in the first, old format. Next, at step 105, a determination is made as to whether the file in question has a new data map associated with it, meaning that the format for the type of record included in that file has changed such that it now has a new data map that describes the format of the record type. If the answer is no, i.e., a new data map does not exist, that means that the file is no longer being used in the updated and/or revised application and thus no update of the file is required. In such a case, at step 110, a determination is made as to whether that file is the last file to be updated. If the answer is yes, then, at step 115, the update process is complete. If the answer is no, then, at step 120, the next file in the group of files to be updated is obtained and the process returns to step 105.

If, at step 105, a determination is made that the file in question does indeed have a new data map, then, at step 125, both the old data map for the relevant record type and the new data map for the relevant record type are obtained from memory. The relevant record type is known based on the file in question, as each file contains records of one particular type. The software may store a table that maps each file to a record type (and thus a data map) to assist in this process. Next, at step 130, a determination is made as to whether the old data map and the new data map just obtained are the same. If the answer is yes, then that means there have been no relevant changes made to the data format for the records in that file, and the method returns to step 110 as no update is required. If, however, the answer at step 130 is no, meaning that the old data map and the new data map for the relevant record type are different, then the method proceeds to step 135.

In step 135, the first record, which is an old record, in the file in question is obtained. As will be appreciated, this old record includes data in the old format as set forth in the old data map. Next, at step 140, a new record is initialized, preferably with zero default values in each location, in a temporary file. This temporary file will be used to construct a new file for the data to be updated. Next, as shown in step 145, information from the first field in the old record in question is obtained. At step 150, a determination is made as to whether the field in question from the old record is also present in the new record to be created. This determination is made by examining the new data map to determine whether it includes a field having a name that matches the field in question. If the answer at step 150 is no, then that means that the new format as reflected in the new data map no longer includes the field in question and, as a result, the data contained in the field in question in the old record is discarded and not included in the new record. If, however, at step 150 it is determined that the field in question from the old record is also present in the new record format, then, at step 155, a determination is made for the field in question as to whether the size of the field data is the same between the old format as indicated by the old data map and the new format as indicated by the new data map. Preferably, referring to the examples shown in FIGS. 1A and 1B, a determination is made as to whether the field type length and field length in the two formats (old and new) are the same. If, at step 155, it is determined that there has been a change in size, then, at step 160, a determination is made as to whether the new size is greater than or equal to the old size. Preferably, again referring to FIGS. 1A and 1B, a determination is made as to whether the field type length and field length as indicated in the new data map are greater than or equal to the field type length and field length as indicated in the old data map. If the answer is no, as seen in step 165, a warning is issued that indicates that data may be lost as a result of the change in size for the record. In many applications, this may not be a problem due to the fact that the size allocated for the particular field may have been diminished intentionally in the new format because too much space was originally allocated in the old format. If this is the case, then data will likely not be lost.

Next, referring to step 170, if the answer at step 155 is no, the answer at step 160 is yes, or after completion of step 165, if applicable, then the data in the field in question from the old record is moved from the old field location as indicated by the old data map to the new field location in the new record in the temporary file as indicated by the new data map. At step 175, a determination is then made as to whether the field just operated upon was the last field in the old record. If the field just operated upon is not the last field in the old record currently in question, then, at step 180, the method proceeds by obtaining the information from the next field in the old record in question. Thereafter, the method returns to step 150 for continued processing.

If the answer at step 175 is yes, then, at step 185, a determination is made as to whether the old record in question is the last record in the file in question. If the answer is yes, then that means that all of the fields and records in the file currently being updated have in fact been updated and, at step 190, the new record in the temporary file that has been built is saved as a new data file. Preferably, the new records in the temporary file are actually written over the old records in the data file being updated. Alternatively, the temporary file may be saved as a new file. The method then proceeds to step 110 to determine whether there are more files to be updated. If, however, a determination is made at step 185 that the record currently in question is not the last record in the file, then, at step 195 the next old record from the file in question is obtained and the method returns to step 140 for continued processing.

As will be appreciated, the method will continue as indicated until each of the files in question have been considered and, if appropriate, updated on a record by record and a field by field basis using the old and new data maps. It will also be appreciated that, because in step 140 the new record in the temporary file is initialized with a default value or values such as zero, in the event that a new field is added to the record type in question (it was not part of the old format for the record type), that field in the new record will maintain that default value as there is no corresponding data in the old record to transfer.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of converting data stored in a file from a first format used by a first software application, to a new file in a second format used by a second software application, said file having one or more records, each of said records having one or more fields having one or more data elements, each of said records being associated with a first data map corresponding to said first format and a second data map corresponding to said second format, the method comprising:

(a) accessing a selected record from said file, said selected record being one of said one or more records of said file;
  (b) initializing a new record;
  (c) for each field of said selected record, using said first data map associated with said selected record and said second data map associated with said selected record to determine whether said field is present in said second format, and if said field is not present in said second format, discarding said one or more data elements of said field from said selected record, and if said field is present in said second format, copying said one or more data elements of said field to said new record at a field location for said field set forth in said second data map associated with said selected record;

(d) repeating steps (a), (b), and (c) for each of a remaining one or more of said records of said file; and (e) saving said new records as said new file in said second format for use by said second software application.

2. A method according to claim 1, said data further comprising data stored in one or more additional files, each of said additional files having one or more records each having one or more fields having one or more data elements, each of said records in each said additional file being associated with a first data map corresponding to said first format and a second data map corresponding to said second format, said method further comprising repeating steps (a), (b), (c), and (d) for each of said additional files.

3. A method according to claim 1, wherein step (c) further comprises issuing a potential data loss warning if a first size of said one or more data elements of said field as set forth in said first data map associated with said selected record is larger than a second size of said one or more data elements of said field as set forth in said second data map associated with said selected record.

4. A method according to claim 3, wherein said first data map associated with the selected record and said second data map associated with the selected record include information relating to a field type length and a field length for each field in said selected record, said first and second size for each said field being based on said field type length and field length information for each said field.

5. A method according to claim 1, wherein step (b) further comprises initializing said new record in a temporary file, said method further comprising saving said temporary file as said new file.

6. A method according to claim 1, wherein step (b) further comprises initializing said new record in a temporary file, said method further comprising overwriting said file with said temporary file.

7. A method according to claim 1, wherein in step (b) said new record has one or more fields, said fields of said new record being initialized with one or more default values.

* * * * *